(12) United States Patent
Gilbert et al.

(10) Patent No.: US 12,249,041 B2
(45) Date of Patent: Mar. 11, 2025

(54) OBLIQUE IMAGE RECTIFICATION (71) Applicant: INTERNATIONAL BUSINESS MACHINES CORPORATION, Armonk, NY (US)

(72) Inventors: Sebastien Gilbert, Québec (CA); Michele Merler, New York, NY (US); Dhiraj Joshi, Edison, NJ (US); Apurv Gupta, Vadodara (IN); Shyama Prosad Chowdhury, Kolkata (IN); Chidansh Amitkumar Bhatt, Hightstown, NY (US); Nirmit V. Desai, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 18/048,975

(22) Filed: Oct. 24, 2022

(65) Prior Publication Data

US 2024/0135486 A1 Apr. 25, 2024
US 2024/0233067 A9 Jul. 11, 2024

(51) Int. Cl.
*G06T 3/02* (2024.01)
*G06T 3/4046* (2024.01)

(52) U.S. Cl.
CPC .............. *G06T 3/02* (2024.01); *G06T 3/4046* (2013.01)

(58) Field of Classification Search
CPC ........... G06T 3/02; G06T 3/4046; G06T 5/80; G06T 2207/10024; G06T 2207/20036; G06T 2207/20084; G06T 2207/30108
See application file for complete search history.

(56) References Cited

U.S. PATENT DOCUMENTS

| 2007/0043672 | A1* | 2/2007 | Martin | G06Q 30/04 705/51 |
| 2020/0327360 | A1* | 10/2020 | Samala | G06V 10/82 |
| 2021/0142102 | A1* | 5/2021 | Al Rashdan | G06V 10/225 |
| 2021/0174131 | A1* | 6/2021 | Schwartz | G06N 3/045 |
| 2021/0192207 | A1 | 6/2021 | Narahari | |

FOREIGN PATENT DOCUMENTS

CN 114757922 A 7/2022

OTHER PUBLICATIONS

Zhang, Aston, et al., Dive into Deep Learning, Mar. 31, 2019, https://d2l.ai/chapter_computer-vision/fcn.html and archived at archive.org as of Mar. 31, 2019 (Year: 2019).*

(Continued)

*Primary Examiner* — William A Beutel
(74) *Attorney, Agent, or Firm* — Stosch Sabo (57) ABSTRACT

Described are techniques for oblique image rectification. The techniques include receiving an original image depicting an oblique view of a circular object and pre-processing the original image into an edge image. The techniques further include generating, by a machine learning model based on the edge image, a heatmap including an ellipse formed by the oblique view of the circular object. The techniques further include computing ellipse parameters describing the ellipse of the heatmap. The techniques further include performing, using the ellipse parameters, an affine transformation on the original image to generate a rectified image, where the rectified image converts the ellipse to a circle.

20 Claims, 8 Drawing Sheets

(56) References Cited

OTHER PUBLICATIONS

Chalechale, Abdolah, Alfred Mertins, and G. Naghdy. "Edge image description using angular radial partitioning." IEE Proceedings—Vision, Image and Signal Processing 151.2 (2004): 93-101. (Year: 2004).*

Günther et al., "Industrial Manometer Detection and Reading for Autonomous Inspection Robots," 978-6654-1213-1/21 IEEE, European Conference on Mobile Robots (ECMR), 2021, 6 pgs.

Github, "Analoguie-Gauge-Reader", axn170037, Accessed on Sep. 2, 2022, 9 pgs, <https://github.com/axn170037/Analogue-Gauge-Reader/blob/master/Analogue_reader-II.ipynb>.

Github, Computervisionmerl, "Analog-Gauge-Reading", Accessed Sep. 2, 2022, 6 pgs, <https://github.com/computervisionmerl/Analog-Gauge-Reading>.

Gupta et al., "Using Line and Ellipse Features for Rectification of Broadcast Hockey Video", Laboratory for Computational Intelligence (LCI), The University of British Columbia, Vancouver, CA, Accessed Sep. 19, 2022, 8 pgs. <https://www.cs.ubc.ca/labs/lci/thesis/ankgupta/gupta11crv.pdf>.

Li et al., "A High-Robust Automatic Reading Algorithm of Pointer Meters Based on Text Detection" Sensors 2020, 20, 5946, 17 pgs, <https://www.mdpi.com/1424-8220/20/20/5946>.

Merriaux, et al., "The Vikings autonomous inspection robot: Competing in the Argos challenge." IEEE Robotics & Automation Magazine 26, No. 1 ( Mar. 2019): 15 pgs.

Singh et al., "ViDAQ: A computer vision based remote data acquisition system for reading multi-dial gauges," J. Industrial Information Integration, Doi:org/10.10.1016/j.jii.2019.05.001, vol. 15, Sep. 2019, 17 pgs.

Xu et al., "Pointer Gauge Adaptive Reading Method Based on a Double Match," Measurement Science and Technology, 31, 115002, 2020. Published Aug. 14, 2020, 13 pgs, <https://doi.org/10.1088/1361-6501/ab9410>.

Yuan, "A method of correcting the pointer reading of deflection pointer instrument," 978-1-5386-3524-7/17 2017 IEEE, Chinese Automation Congress (CAC), 4 pgs.

Gunther et al: "Industrial Manometer Detection and Reading for Autonomous Inspection Robots", 2021 European Conference on Mobile Robots (ECMR), IEEE, Aug. 31, 2021 , pp. 1-6.

Li et al: "Automatic Gauge Detection via Geometric Fitting for Safety Inspection", IEEE Access, Jul. 17, 2019, 7pages, vol. 7.

Long et al: "Ellipse Fitting Based on Neural Network Optimization", 2022 41st Chinese Control Conference (CCC), Technical Committee on Control Theory, Chinese Association of Automation, Jul. 25, 2022, pages.

PCT Written Opinion of the International Searching Authority nfor International Application No. PCT/IB2023/59702, Jan. 3, 2024, 11 pages.

Xie, Yingdi: "Research on a Modified RANSAC and its Applications to Ellipse Detection from a Static Image and Motion Detection from Active Stereo Video Sequences", Feb. 1, 2010 , pp. 1-132.

* cited by examiner

OBLIQUE IMAGE RECTIFICATION

BACKGROUND

The present disclosure relates to automated image modification, and, more specifically, to oblique image rectification.

Images of circular objects taken from angles (e.g., oblique images) can cause the circular objects to appear elliptical. Oblique images are common given the variety of situations in which a camera (and/or associated user) may be unable to capture an image of the circular object from a vantage point precisely in front of the circular object. Furthermore, humans are capable of readily inferring information about the circular object from its elliptical appearance in an oblique image. Thus, oblique images present few or no problems for human understanding. However, image recognition algorithms can have increased error rates when classifying, characterizing, or otherwise inferring information from a circular object that appears elliptical in an oblique image.

SUMMARY

Aspects of the present disclosure are directed toward a computer-implemented method comprising receiving an original image depicting an oblique view of a circular object. The method further comprises pre-processing the original image into an edge image. The method further comprises generating, by a machine learning model based on the edge image, a heatmap including an ellipse formed by the oblique view of the circular object. The method further comprises computing ellipse parameters describing the ellipse of the heatmap. The method further comprises performing, using the ellipse parameters, an affine transformation on the original image to generate a rectified image, where the rectified image converts the ellipse to a circle.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward automated image modification, and, more specifically, to oblique image rectification. While not limited to such applications, embodiments of the present disclosure may be better understood in light of the aforementioned context.

As previously discussed, image recognition algorithms can have increased error rates when classifying, characterizing, predicting, or otherwise inferring information from a circular object that appears elliptical in an oblique image. While this challenge occurs throughout the technological of field image classification, it is particularly problematic in applications designed to collect information from an oblique image of a circular object and, optionally, to perform an action based on the collected information.

One example application relates to automated reading of analog gauges. Analog gauges can be used to measure pressures, temperatures, flow rates, volumes, and/or other information. A camera can be located near an analog gauge, and images from the camera can be collected and automatically evaluated to collect information about the analog gauge (e.g., a pressure reading, a temperature reading, a flow rate reading, etc.) from the image. In many instances, the camera may be unable to be positioned directly in front of the analog gauge, and thus, the images collected from the camera are oblique images where the circular analog gauge appears elliptical. This can occur in situations where a camera simply cannot be located in front of an analog gauge and/or in situations where a single camera is positioned to collect information from multiple analog gauges in the field of view of the camera. In these situations, the image analysis software evaluating circular analog gauges from oblique images is susceptible to errors due to the elliptical appearance of the circular analog gauges. While analog gauges are discussed above, aspects of the present disclosure are relevant to any approximately circular object with an automated image analysis application (e.g., clocks, sport analytics, targets, road signs, etc.).

Aspects of the present disclosure are directed to overcoming the aforementioned challenge by converting an oblique image of a circular object that appears elliptical to a rectified image where the circular object appears circular. Aspects of the present disclosure can accurately convert the oblique image to the rectified image by (i) generating a heatmap of an ellipse formed by the circular object in the oblique image, (ii) determining ellipse parameters from the heatmap, and (iii) performing an affine transformation on the oblique image using the ellipse parameters to convert the oblique image of the circular object appearing elliptical to a rectified image of the circular object appearing circular.

Advantageously, aspects of the present disclosure result in increased accuracy of image analysis involving an oblique image of a circular object. More specifically, aspects of the present disclosure advantageously generate the heatmap using a Fully Convolutional Neural Network (FCNN) which is well-suited to generating heatmaps of ellipses from oblique images of circular objects. As another example advantage, the heatmap eliminates most extraneous (e.g., outlier) pixels that are unrelated to the circular object in the oblique image. As a result, the heatmap can enable ellipse parameters to be determined in a single computational pass (whereas other, less robust techniques can require multiple computational passes which are time-consuming and inefficient). As yet another example advantage, the present disclosure can be utilized to rectify any circular object in an oblique image (e.g., it need not be limited to one application, such as analog gauges).

Figure 1:
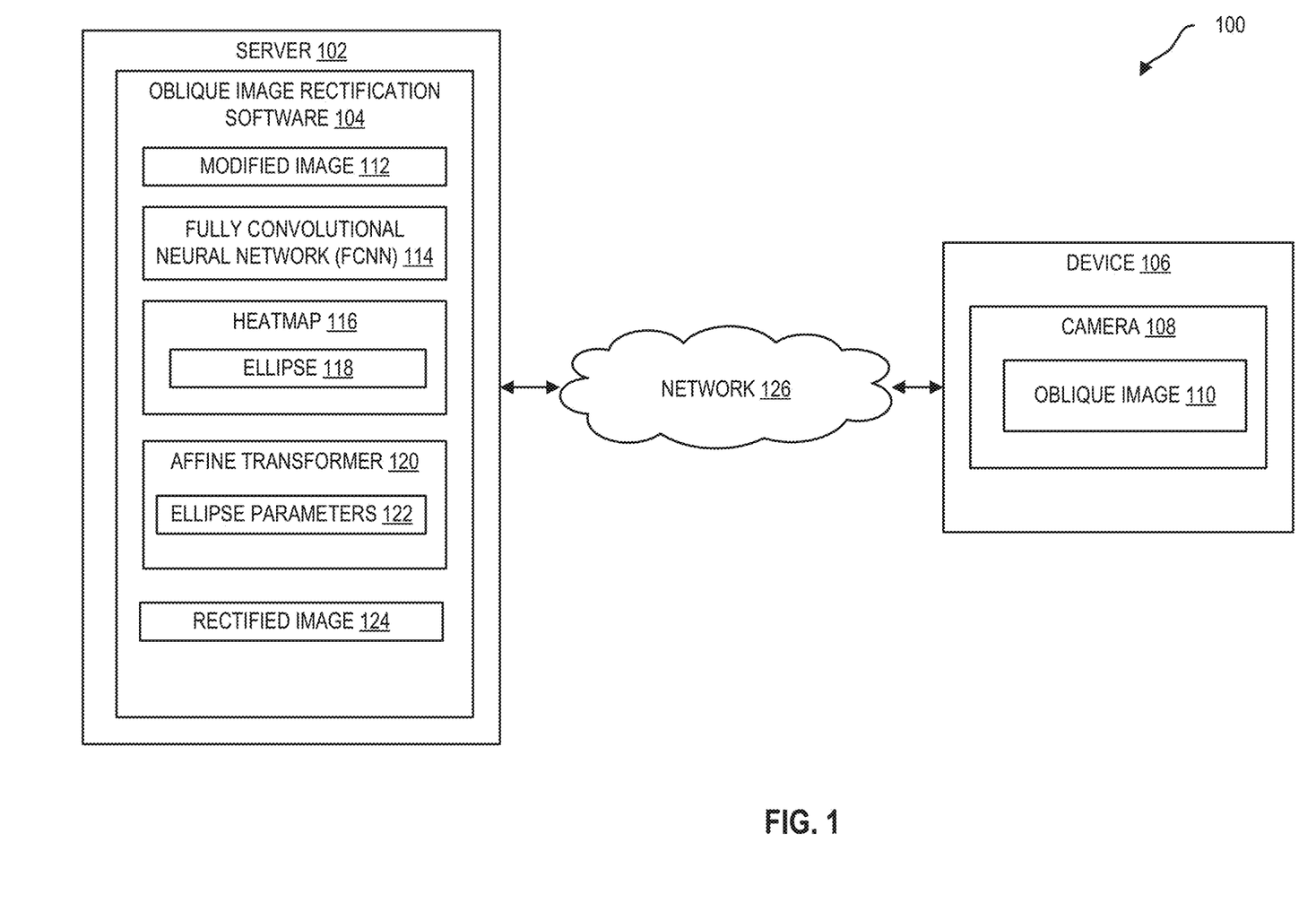
FIG. 1 illustrates a block diagram of an example computational environment implementing image rectification software, in accordance with some embodiments of the present disclosure.

Referring now to the figures, FIG. 1 illustrates a block diagram of an example computational environment 100 implementing oblique image rectification software 104, in accordance with some embodiments of the present disclosure. The example computational environment 100 includes a server 102 communicatively coupled to a device 106 via a network 126.

Server 102 can be any computational configuration of hardware and/or software capable of implementing oblique image rectification software 104. In some embodiments, server 102 can be any server, computer, mainframe, or other combination of computer hardware capable of executing software. In some embodiments, server 102 can be a virtual machine (VM), container instance, or other virtualized combination of discrete physical hardware resources.

Device 106 can be any camera, smartphone, tablet, wearable device, or other device having a camera 108. The device 106 can use the camera 108 to generate oblique image 110. The oblique image 110 includes a circular object, where the circular object appears elliptical in the oblique image 110 due to the angle formed between the camera 108 and the circular object when generating the oblique image 110.

The network 126 can be a local area network (LAN), a wide area network (WAN), an intranet, the Internet, or any other network 126 or group of networks 126 capable of continuously, semi-continuously, or intermittently connecting (directly or indirectly) the aforementioned components together.

Server 102 can implement oblique image rectification software 104. Oblique image rectification software 104 can be configured to convert the oblique image 110 to a rectified image 124, where the rectified image 124 causes the circular object to appear circular (rather than elliptical). The oblique image rectification software 104 can be configured to modify the oblique image 110 to generate a modified image 112. The modified image 112 can be cropped, resized, converted to grayscale, transformed to an edge image, and/or blurred, for example. The modified image 112 can be provided to a FCNN 114, where the FCNN 114 is trained (e.g., on a dataset comprising real and/or synthetic data) to generate heatmaps of ellipses in oblique images of circular objects. The FCNN 114 can output heatmap 116, where the heatmap 116 includes an ellipse 118 formed by the circular object in the oblique image 110. Advantageously, a FCNN is robust at generating heatmaps with relatively few outlier pixels, thereby improving the accuracy and efficiency of the heatmap generation process. Although FCNN 114 is discussed above, other types of machine learning models, now known or later developed, can also be used in place of FCNN 114.

The oblique image rectification software 104 can compute ellipse parameters 122 from the ellipse 118 of the heatmap 116. Ellipse parameters 122 can include, for example, an ellipse center, axis lengths (e.g., half-lengths of the major axis and/or the minor axis), an angle of a main (e.g., major) axis, and/or other ellipse parameters (e.g., foci points, eccentricity, axis intersection points (e.g., vertices), an angle of a secondary (e.g., minor) axis, etc.). The ellipse parameters 122 can be provided to the affine transformer 120 together with the modified image 112. The affine transformer 120 can apply an affine transformation to the modified image 112 using the ellipse parameters 122 to generate rectified image 124. In rectified image 124, the circular object appears circular (rather than elliptical) as a result of the affine transformation performed by the affine transformer 120.

FIG. 1 is for illustrative purposes and should not be construed as limiting. More, fewer, and/or different components than the components illustrated in FIG. 1 can be present while remaining within the spirit and scope of the present disclosure. Further, illustrated components can be separated into multiple, discrete components, and/or multiple discrete components can be combined together into a single component, while remaining within the spirit and scope of the present disclosure. For example, oblique image rectification software 104 can be implemented, in whole or in part, on the device 106 rather than, or in addition to, implementation on server 102.

Figure 2:
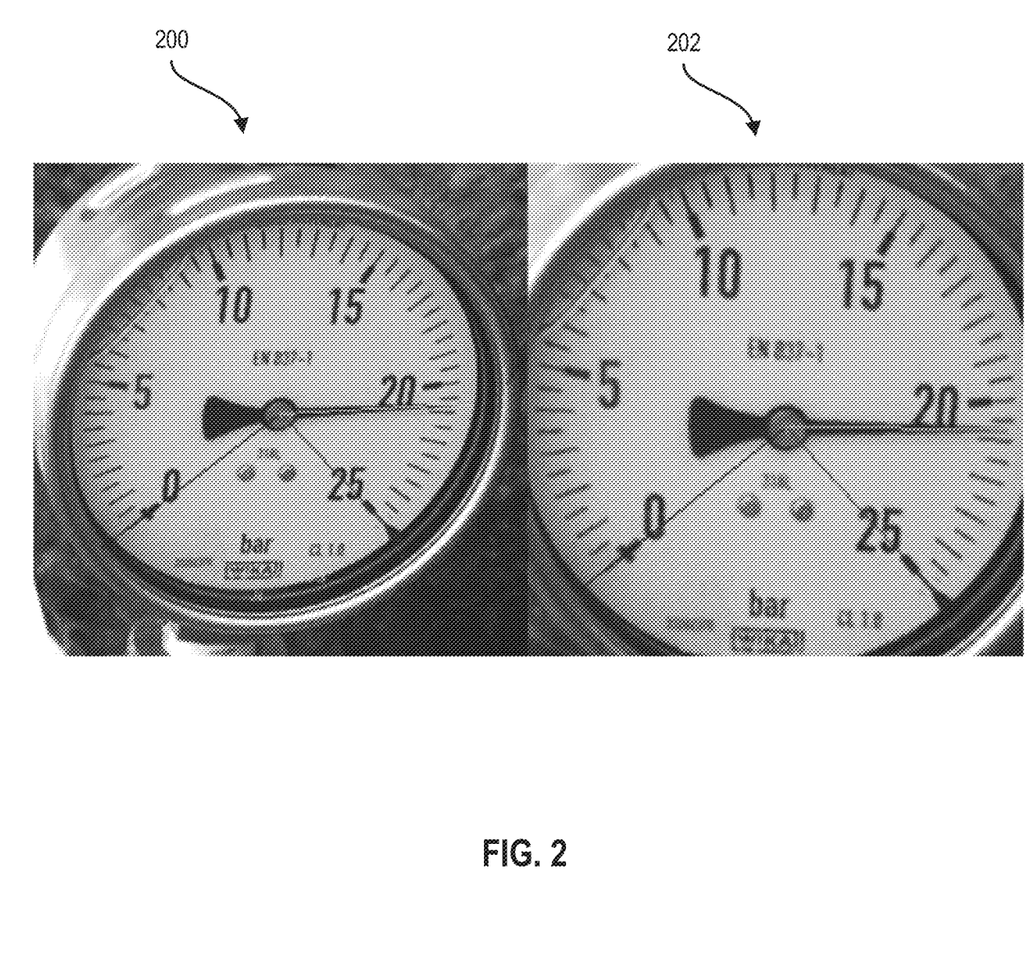
FIG. 2 illustrates an oblique image causing a circular object to appear elliptical and a rectified image that modifies the circular object from the oblique image to appear circular, in accordance with embodiments of the present disclosure.

FIG. 2 illustrates an oblique image 200 causing a circular object to appear elliptical and a rectified image 202 that modifies the circular object from the oblique image to appear circular, in accordance with embodiments of the present disclosure. In some embodiments, the oblique image 200 is consistent with oblique image 110 of FIG. 1 and the rectified image 202 is consistent with the rectified image 124 of FIG. 1. Advantageously, the rectified image 202 results in increased accuracy when evaluated using image analysis.

FIGS. 3A, 3B, 3C, 3D, 3E, 3F, 3G, 3H, 3I, 3J, 3K, and 3L illustrate various intervening images to generate a rectified image from an oblique image, in accordance with embodiments of the present disclosure. FIGS. 3A-3K are discussed at a high level, while FIGS. 4-6 will discuss the operations to generate each of FIGS. 3A-3K in more detail.

Figure 3A:
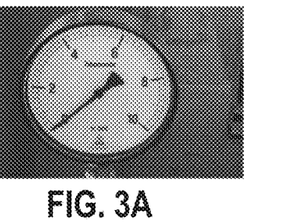
FIGS. 3A, 3B, 3C, 3D, 3E, 3F, 3G, 3H, 3I, 3J, 3K, and 3L illustrate various intervening images to generate a rectified image from an oblique image, in accordance with embodiments of the present disclosure.

FIG. 3A illustrates an oblique image. As shown, the circular analog gauge in FIG. 3A is photographed at an angle, thereby causing the circular analog gauge to appear elliptical. The oblique image illustrated in FIG. 3A can be consistent with the oblique image 110 of FIG. 1 and/or the oblique image 200 of FIG. 2.

Figure 3B:
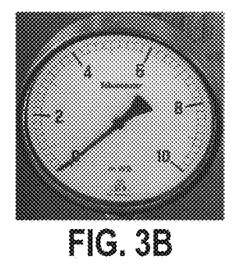

FIG. 3B illustrates a cropped and resized oblique image. Cropping and/or resizing the oblique image can increase the accuracy of the rectified image (and thereby, the accuracy of image analysis performed on the rectified image) by converting the oblique image to a size and format consistent with sizes and formats of a trained FCNN for generating heatmaps of ellipses formed by oblique images of circular objects.

Figure 3C:
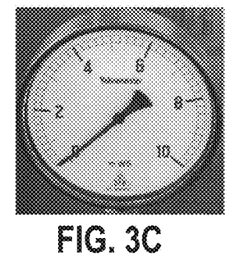

FIG. 3C illustrates the cropped and resized oblique image converted to grayscale. While the drawings are depicted in black and white for simplicity, in some embodiments, FIG. 3A (the original oblique image), FIG. 3B (the cropped and resized image), and FIG. 3L (the rectified image) are color images. In such embodiments, FIG. 3C is a grayscale image corresponding to a color image.

Figure 3D:
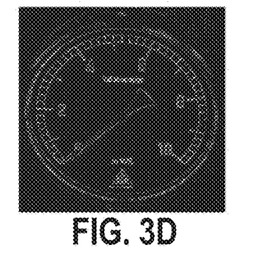
Figure 3E:
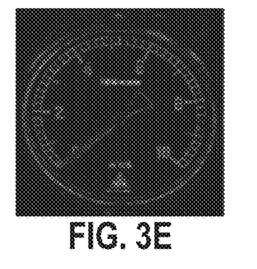

FIG. 3D illustrates an edge image generated by applying an edge detector (e.g., a Laplacian image generated by applying a Laplacian operator, a Canny image generated by applying a Canny operator, a Sobel image generated by applying a Sobel operator, a Deriche image generated by applying a Deriche operator, a Prewitt image generated by applying a Prewitt operator, etc.) to the grayscale image of FIG. 3C. FIG. 3E illustrates the edge image of FIG. 3D with its edges blurred.

Figure 3F:
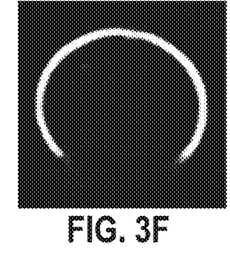

FIG. 3F illustrates a heatmap generated by providing the blurred edge image of FIG. 3E to a machine learning model (e.g., FCNN 114 of FIG. 1). The heatmap of FIG. 3F can be consistent with heatmap 116 of FIG. 1.

Figure 3G:
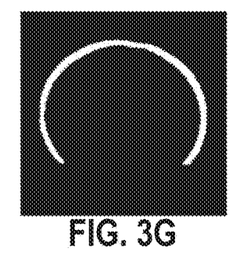
Figure 3H:
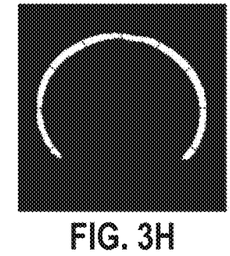

FIG. 3G illustrates a thresholded heatmap, where the thresholded heatmap is a binary image that can be dilated and/or eroded to remove any screendoor effects. FIG. 3H is a chunked heatmap. FIG. 3H partitions the ellipse formed in the thresholded heatmap into several chunks.

Figure 3I:
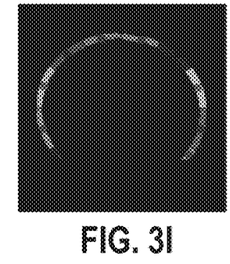
Figure 3J:
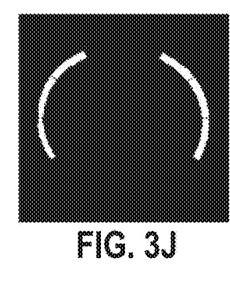

FIG. 3I illustrates the chunked heatmap with each chunk detected. FIG. 3J illustrates a filtered, chunked heatmap where various chunks are removed from the heatmap (e.g., chunks that are too small, which exhibit a distance from a collective center of mass of the chunks beyond a threshold distance, etc.).

Figure 3K:
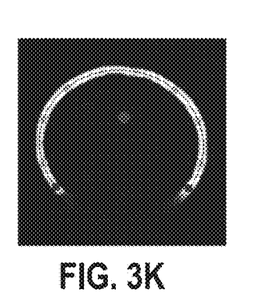
Figure 3L:
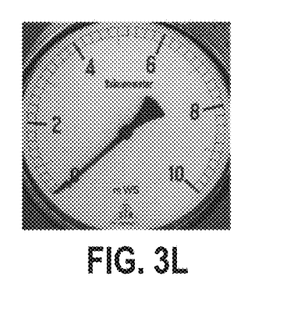

FIG. 3K illustrates the fitted ellipse (e.g., ellipse 118 of FIG. 1) from the filtered, chunked heatmap of FIG. 3J. Finally, FIG. 3L illustrates a rectified image, where the rectified image is the cropped and/or resized image of FIG. 3B after applying an affine transformation based on the ellipse parameters to convert the oblique image portraying the circular analog gauge as an ellipse to portraying the circular analog gauge as a circle. FIG. 3L can be consistent with rectified image 124 of FIG. 1 and/or rectified image 202 of FIG. 2. Advantageously, the rectified image illustrated in FIG. 3L improves accuracy of image analysis algorithms, models, and/or techniques used to interpret information on the circular analog gauge.

Figure 4:
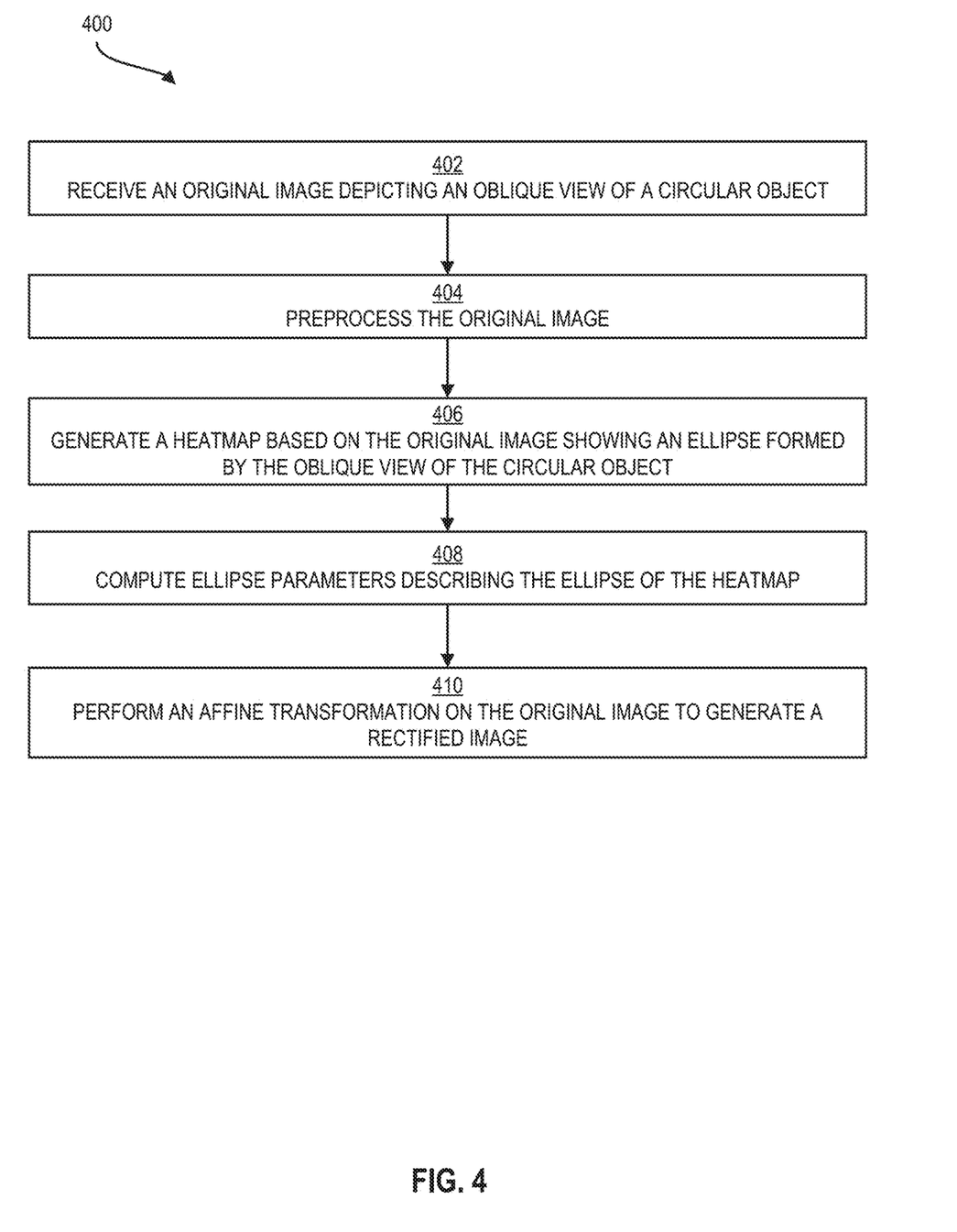
FIG. 4 illustrates a flowchart of an example method for implementing image rectification software, in accordance with some embodiments of the present disclosure.

FIG. 4 illustrates a flowchart of an example method 400 for implementing image rectification software, in accordance with some embodiments of the present disclosure. In some embodiments, the method 400 is implemented by a computer, a server (e.g., server 102 of FIG. 1), a device (e.g., device 106 of FIG. 1), a processor, or another configuration of hardware and/or software.

Operation 402 includes receiving an original image depicting an oblique view of a circular object. Operation 402 can receive the oblique image 110 of FIG. 1, for example. The oblique view of the circular object can cause the circular object to appear elliptical.

Operation 404 includes preprocessing the original image to generate a modified image (e.g., modified image 112 of FIG. 1). Preprocessing the image can include one or more of (i) cropping the image, (ii) resizing the image, (iii) converting the image to grayscale, (iv) applying an edge detection to the image (e.g., applying a Laplacian operator, a Canny operator, a Sobel operator, a Deriche operator, a Prewitt operator, etc.) to the image, and/or (v) blurring the edge image. Operation 404 is discussed in more detail hereinafter with respect to FIG. 5.

Operation 406 includes generating a heatmap (e.g., heatmap 116 of FIG. 1) based on the original image showing an ellipse (e.g., ellipse 118 of FIG. 1) formed by the oblique view of the circular object. The heatmap can be generated by inputting the preprocessed original image to a machine learning model (e.g., FCNN 114 of FIG. 1), where the machine learning model outputs the heatmap.

Operation 408 includes computing ellipse parameters (e.g., ellipse parameters 122 of FIG. 1) describing the ellipse of the heatmap. Ellipse parameters can include, for example, an ellipse center, axis lengths (e.g., half-lengths of the major axis and/or the minor axis), an angle of a main (e.g., major) axis, and/or other ellipse parameters (e.g., foci points, eccentricity, axis intersection points (e.g., vertices), an angle of a secondary (e.g., minor) axis, etc.).

Operation 410 includes performing an affine transformation on the original image to generate a rectified image (e.g., rectified image 124 of FIG. 1). As is understood by one skilled in the art, an affine transformation is a geometric transformation which preserves lines and parallelism while not necessarily preserving distances or angles. Affine transformations can include translations, scaling, homothety, similarity, reflection, rotation, shear mapping, and/or compositions of the aforementioned in any combination and/or sequence. Affine transformations can be performed using matrix algebra. The affine transformation can take the ellipse parameters calculated in operation 408 and the original image as inputs and output the rectified image. In the rectified image, the circular object appears circular.

Figure 5:
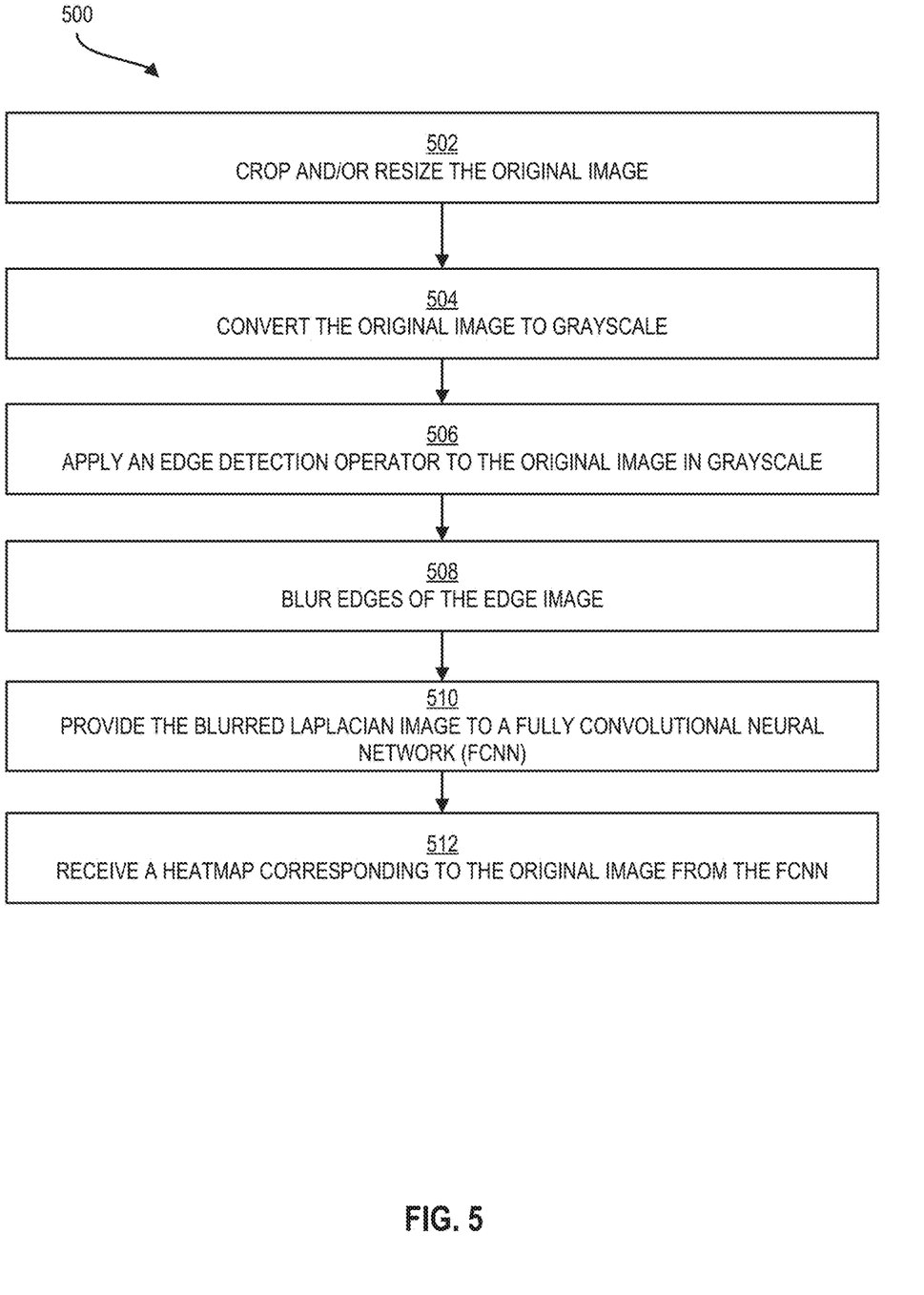
FIG. 5 illustrates a flowchart of an example method for generating a heatmap corresponding to an oblique image, in accordance with some embodiments of the present disclosure.

FIG. 5 illustrates a flowchart of an example method 500 for generating a heatmap corresponding to an oblique image, in accordance with some embodiments of the present disclosure. In some embodiments, the method 500 is implemented by a computer, a server (e.g., server 102 of FIG. 1), a device (e.g., device 106 of FIG. 1), a processor, or another configuration of hardware and/or software. In some embodiments, the method 500 is a sub-method of operations 404 and/or 406 of FIG. 4.

Operation 502 includes cropping and/or resizing the original image. Operation 502 can crop the original image to select an identifiable region of interest (e.g., the circular object). Operation 502 can resize the image to be a same size as images used during training of the machine learning model. Operation 502 can result in an image such as shown in FIG. 3B.

Operation 504 includes converting the cropped and/or resized image to grayscale. Operation 504 can convert the cropped and/or resized image to grayscale by selecting a maximum gray level for each of the Red, Green, Blue (RGB) channels for each pixel of the cropped and/or resized image. Advantageously, utilizing grayscale (e.g., utilizing the RGB maximum value) increases accuracy of aspects of the present disclosure by mitigating confounding factors introduced by various colors (e.g., a multi-colored analog gauge scale). Furthermore, the particular method of converting the image to grayscale described above results in increased contrast for relevant features of the circular object in the original image (e.g., dial ticks in an analog gauge) as opposed to other grayscale conversion mechanisms (e.g., based on luminance). Operation 504 can result in an image such as shown in FIG. 3C.

Operation 506 includes applying an edge detection operator (e.g., Laplacian operator) to the grayscale image. Advantageously, the edge detection operator can emphasize important portions of the circular object in the grayscale image. For example, when the circular object is an analog gauge, and when the edge detection operator is a Laplacian operator, the Laplacian operator can emphasize dial ticks in the analog gauge. As is understood by one skilled in the art, the Laplacian operator is based on a divergence of a gradient of a function (e.g., a gradient of pixel characteristics in an image). In this way, the Laplacian operator can function as a digital filter to identify edges of an image. Operation 506 can result in an image such as shown in FIG. 3D.

Operation 508 includes blurring edges of the edge image. Blurring the edges can improve the performance of the machine learning model in accurately generating a heatmap by the machine learning model. Blurring the edges of the edge image can be performed by adjusting grayscale values of pixels adjacent to edge pixels (e.g., making each pixel a grayscale value consistent with an average grayscale value of adjacent pixels). Operation 508 can result in an image such as shown in FIG. 3E.

Operation 510 includes providing the blurred edge image to a machine learning model (e.g., FCNN 114 of FIG. 1). The machine learning model can be trained on real and/or synthetic images of circular objects and corresponding heatmaps illustrating elliptical outlines corresponding to the circular objects due to the oblique view of the circular objects. Operation 512 includes receiving a heatmap (e.g., heatmap 116 of FIG. 1) corresponding to the original image from the machine learning model. Operation 510 can result in an image such as shown in FIG. 3F.

Figure 6:
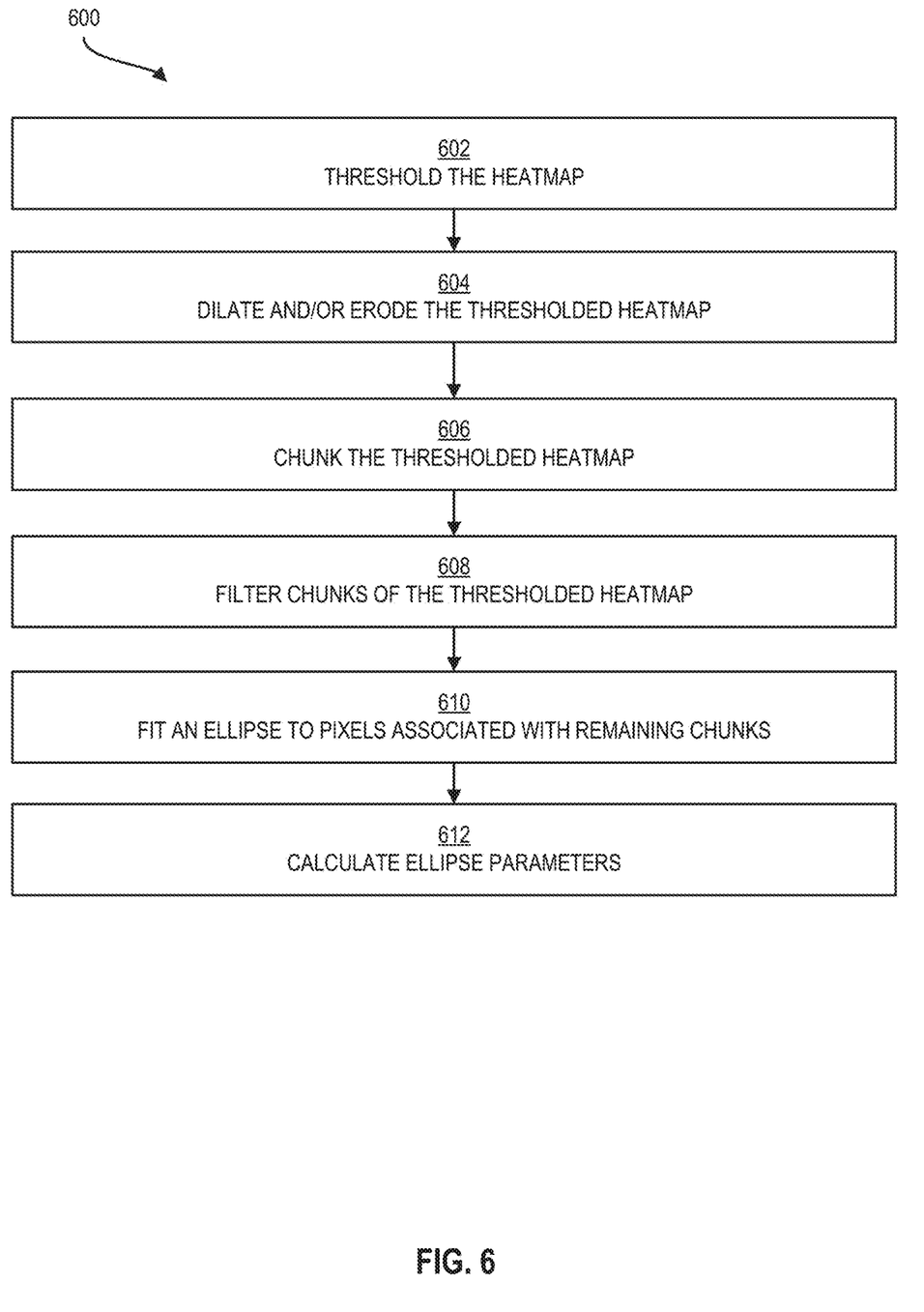
FIG. 6 illustrates a flowchart of an example method for determining ellipse parameters from a heatmap of an oblique image, in accordance with some embodiments of the present disclosure.

FIG. 6 illustrates a flowchart of an example method 600 for determining ellipse parameters from a heatmap of an oblique image, in accordance with some embodiments of the present disclosure. In some embodiments, the method 600 is implemented by a computer, a server (e.g., server 102 of FIG. 1), a device (e.g., device 106 of FIG. 1), a processor, or another configuration of hardware and/or software. In some embodiments, the method 600 is a sub-method of operation 408 of FIG. 4.

Operation 602 includes thresholding the heatmap. The threshold can be a dynamically computed threshold. Operation 602 can thus result in a binary image where each pixel is one value or another value (e.g., black or white). Operation 602 can result in an image such as shown in FIG. 3G.

Operation 604 includes dilating and/or eroding the thresholded heatmap to remove any residual screendoor effects. Dilating can refer to emboldening edges of the image (e.g., by changing pixel color for pixels near a pixel of a predetermined color, such as white, to the same color). Eroding can refer to shrinking edges of an image (e.g., by changing pixel color for pixels near a pixel of a predetermined color, such as white, to an alternate color, such as black). Residual screendoor effects (also referred to as image snow) can refer to erroneous pixel coloring throughout the image which degrade clarity of the image (e.g., a white pixel surrounded by black pixels, or vice versa). Dilating and/or eroding the thresholded heatmap can improve analysis of the image in future operations by reducing or removing any residual screendoor effects.

Operation 606 includes chunking the thresholded heatmap. Operation 606 can partition the heatmap into many small portions (e.g., chunks). Operation 606 can chunk the heatmap by creating radial lines initiating from the image center and radiating outward at predetermined angles, for example. Operation 606 can result in an image such as shown in FIGS. 3H and/or 3I.

Operation 608 includes filtering chunks of the thresholded heatmap. The filtering can remove abnormal (e.g., outlier) or otherwise unhelpful chunks. As one example, operation 608 can remove chunks that are too small or which exceed a distance threshold from a center of mass of the chunks. Operation 608 can result in an image such as shown in FIG. 3J.

Operation 610 includes fitting an ellipse to pixels associated with the remaining chunks of the thresholded heatmap. Operation 610 can involve extending or connecting portions of the thresholded heatmap together to form the entirety of the ellipse. Operation 610 can result in an image such as shown in FIG. 3K.

Operation 612 includes calculating ellipse parameters for the ellipse. Ellipse parameters can include, but are not limited to, an ellipse center, axis lengths (e.g., half-lengths of the major axis and/or the minor axis), an angle of a main (e.g., major) axis, and/or other ellipse parameters (e.g., foci points, eccentricity, axis intersection points (e.g., vertices), an angle of a secondary (e.g., minor) axis, etc.).

Figure 7:
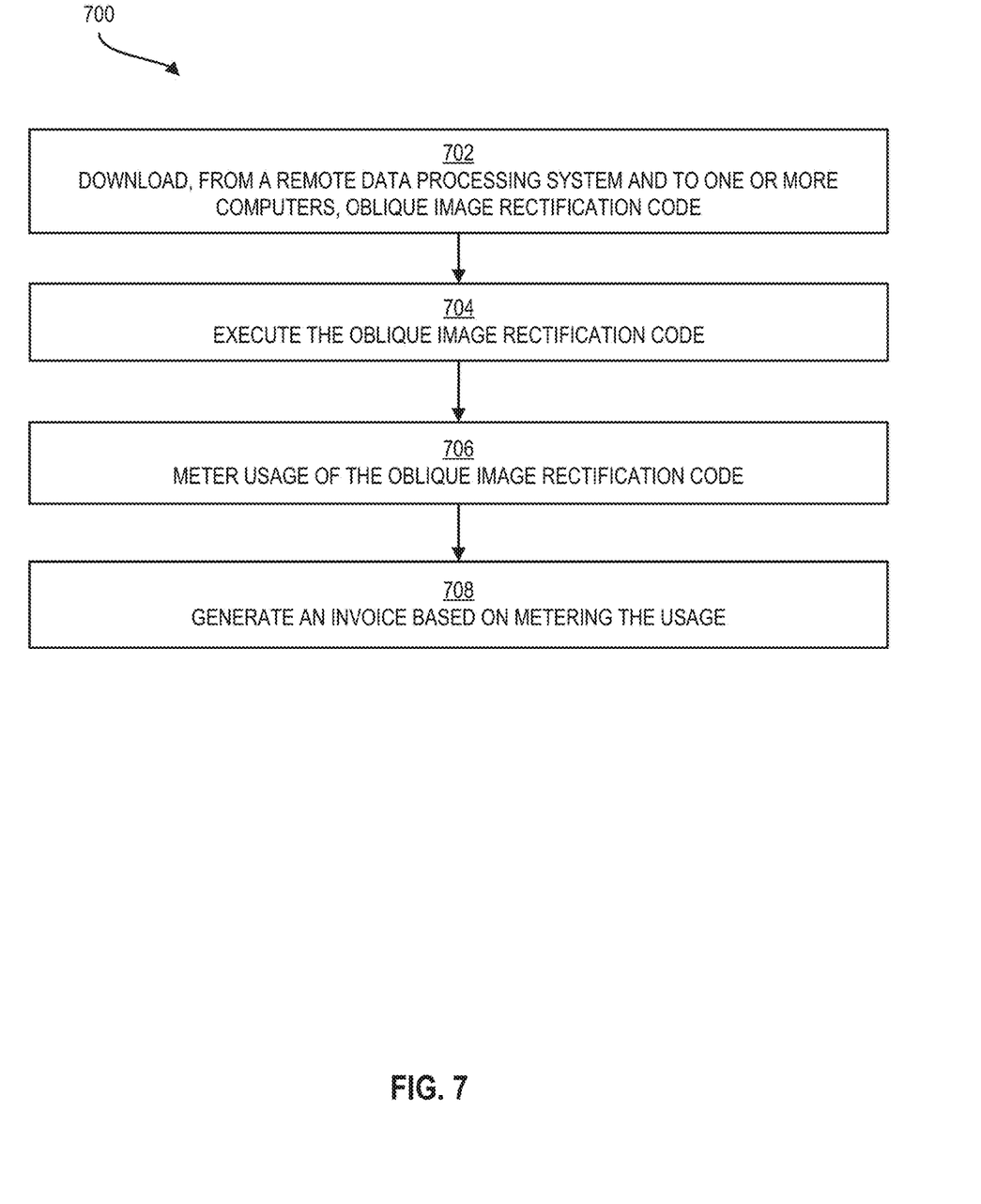
FIG. 7 illustrates a flowchart of an example method for downloading, deploying, metering, and billing usage of oblique image rectification code, in accordance with some embodiments of the present disclosure.

FIG. 7 illustrates a flowchart of an example method 700 for downloading, deploying, metering, and billing usage of oblique image rectification code, in accordance with some embodiments of the present disclosure. In some embodiments, the method 700 is implemented by a computer, a server (e.g., server 102 of FIG. 1), a device (e.g., device 106 of FIG. 1), a processor, or another configuration of hardware and/or software. In some embodiments, the method 700 occurs concurrently with one or more operations of the method 400 of FIG. 4.

Operation 702 includes downloading, from a remote data processing system and to one or more computers (e.g., server 102) oblique image rectification code (e.g., oblique image rectification software 104 of FIG. 1). Operation 704 includes executing the oblique image rectification code. Operation 704 can include performing any of the methods and/or functionalities discussed herein. Operation 706 includes metering usage of the oblique image rectification code. Usage can be metered by, for example, an amount of time the oblique image rectification code is used, a number of servers and/or devices deploying the oblique image rectification code, an amount of resources consumed by implementing the oblique image rectification code, a number of oblique images processed and/or rectified images generated by implementing the oblique image rectification code, and/or other usage metering metrics. Operation 708 includes generating an invoice based on metering the usage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
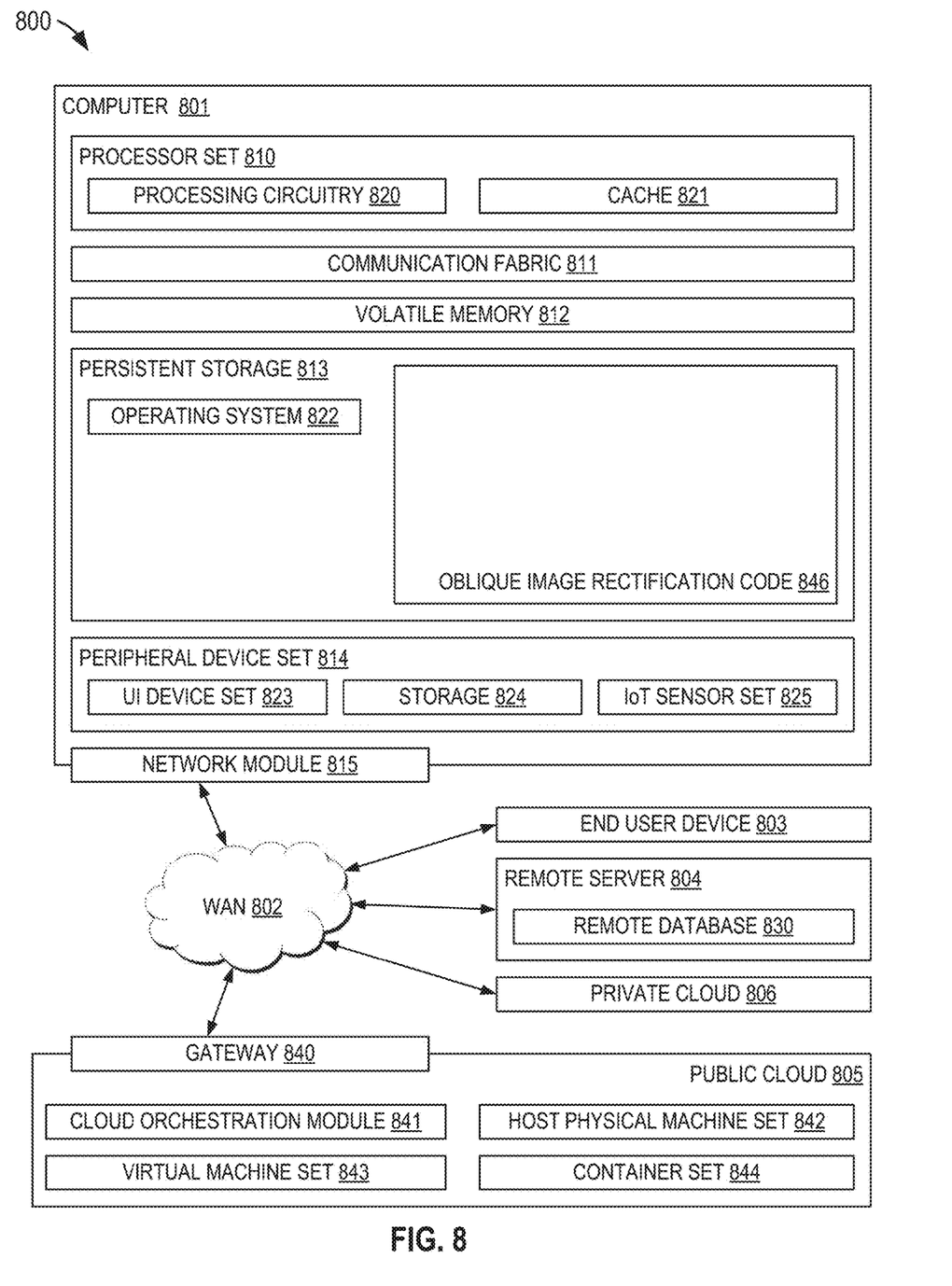
FIG. 8 illustrates a block diagram of an example computing environment, in accordance with some embodiments of the present disclosure.

FIG. 8 illustrates a block diagram of an example computing environment, in accordance with some embodiments of the present disclosure. Computing environment 800 contains an example of an environment for the execution of at least some of the computer code involved in performing the inventive methods, such as Oblique image rectification code 846. In addition to Oblique image rectification code 846, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and Oblique image rectification code 846, as identified above), peripheral device set 814 (including user interface (UI), device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in Oblique image rectification code 846 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in Oblique image rectification code 846 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding of the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes receiving an original image depicting an oblique view of a circular object; pre-processing the original image into an edge image; generating, by a machine learning model based on the edge image, a heatmap including an ellipse formed by the oblique view of the circular object; computing ellipse parameters describing the ellipse of the heatmap; and performing, using the ellipse parameters, an affine transformation on the original image to generate a rectified image, wherein the rectified image converts the ellipse to a circle.

Example 2 includes the features of Example 1. In this example, the circular object is an analog gauge. Optionally, the ellipse is defined by a plurality of dial ticks on the analog gauge.

Example 3 includes the features of any one of Examples 1 to 2, including or excluding optional features. In this example, the ellipse parameters comprise a center of the ellipse, axis half lengths of the ellipse, and an angle of a main axis of the ellipse.

Example 4 includes the features of any one of Examples 1 to 3, including or excluding optional features. In this example, the oblique view of the circular object causes the circular object to appear elliptical in the original image, and wherein the rectified image causes the circular object to appear circular.

Example 5 includes the features of any one of Examples 1 to 4, including or excluding optional features. In this example, the machine learning model is a fully convolutional neural network (FCNN).

Example 6 includes the features of any one of Examples 1 to 5, including or excluding optional features. In this example, the pre-processing comprises converting the original image to grayscale.

Example 7 includes the features of any one of Examples 1 to 6, including or excluding optional features. In this example, the pre-processing comprises: cropping the original image according to the circular object; and resizing the cropped image to a standard size.

Example 8 includes the features of any one of Examples 1 to 7, including or excluding optional features. In this example, the pre-processing comprises: blurring the edge image.

Example 9 includes the features of any one of Examples 1 to 8, including or excluding optional features. In this example, the method further comprises performing a dilate operation and an erode operation on the heatmap.

Example 10 includes the features of any one of Examples 1 to 9, including or excluding optional features. In this example, the method further comprises partitioning the heatmap into a plurality of chunks; and filtering the plurality of chunks.

Example 11 includes the features of any one of Examples 1 to 10, including or excluding optional features. In this example, the edge image is a Laplacian image.

Example 12 includes the features of any one of Examples 1 to 11, including or excluding optional features. In this example, the method is performed by a server implementing oblique image rectification software. Optionally, the method further comprises metering usage of the oblique image rectification software; and generating an invoice based on metering the usage of the oblique image rectification software.

Example 13 is a system. The system includes one or more computer readable storage media storing program instructions; and one or more processors which, in response to executing the program instructions, are configured to perform a method according to any one of Examples 1 to 12, including or excluding optional features.

Example 14 is a computer program product. The computer program product includes one or more computer readable storage media, and program instructions collectively stored on the one or more computer readable storage media, the program instructions comprising instructions configured to cause one or more processors to perform a method according to any one of Examples 1 to 12, including or excluding optional features.

What is claimed is:

1. A computer-implemented method comprising:
   pre-processing an original image into an edge image, wherein the original image depicts an oblique view of a circular object;
   generating, by a machine learning model based on the edge image, a heatmap including an ellipse formed by the oblique view of the circular object;
   partitioning the heatmap into a chunked heatmap by creating radial lines initiating from a center of the heatmap and radiating outward at predetermined angles;
   generating a filtered chunked heatmap by removing chunks that exceed a distance threshold from a center of mass of the chunked heatmap;
   computing ellipse parameters describing the ellipse of the filtered chunked heatmap; and
   performing, using the ellipse parameters, an affine transformation on the original image to generate a rectified image, wherein the rectified image converts the ellipse to a circle.

2. The method of claim 1, wherein the circular object is an analog gauge.

3. The method of claim 2, wherein the ellipse is defined by a plurality of dial ticks on the analog gauge.

4. The method of claim 1, wherein the ellipse parameters comprise a center of the ellipse, axis half lengths of the ellipse, and an angle of a main axis of the ellipse.

5. The method of claim 1, wherein the oblique view of the circular object causes the circular object to appear elliptical in the original image, and wherein the rectified image causes the circular object to appear circular.

6. The method of claim 1, wherein the machine learning model is a fully convolutional neural network (FCNN).

7. The method of claim 1, the pre-processing comprising: converting the original image to grayscale.

8. The method of claim 1, the pre-processing comprising:
   cropping the original image according to the circular object; and
   resizing the cropped image to a standard size.

9. The method of claim 1, the pre-processing comprising: blurring the edge image.

10. The method of claim 1, further comprising:
    performing a dilate operation and an erode operation on the heatmap.

11. The method of claim 1, wherein the edge image is a Laplacian image.

12. The method of claim 1, wherein the method is performed by a server implementing oblique image rectification software, and wherein the method further comprises:
    metering usage of the oblique image rectification software; and
    generating an invoice based on metering the usage of the oblique image rectification software.

13. A system comprising:
one or more computer readable storage media storing program instructions; and
one or more processors which, in response to executing the program instructions, are configured to perform a method comprising:
pre-processing an original image into an edge image, wherein the original image depicts an oblique view of a circular object;
generating, by a machine learning model based on the edge image, a heatmap including an ellipse formed by the oblique view of the circular object;
partitioning the heatmap into a chunked heatmap by creating radial lines initiating from a center of the heatmap and radiating outward at predetermined angles;
generating a filtered chunked heatmap by removing chunks that exceed a distance threshold from a center of mass of the chunked heatmap;
computing ellipse parameters describing the ellipse of the filtered chunked heatmap; and
performing, using the ellipse parameters, an affine transformation on the original image to generate a rectified image, wherein the rectified image converts the ellipse to a circle.

14. The system of claim 13, wherein the circular object is an analog gauge, wherein the ellipse is defined by a plurality of dial ticks on the analog gauge, and wherein the ellipse parameters comprise a center of the ellipse, axis half lengths of the ellipse, and an angle of a main axis of the ellipse.

15. The system of claim 13, wherein the oblique view of the circular object causes the circular object to appear elliptical in the original image, and wherein the rectified image causes the circular object to appear circular.

16. The system of claim 13, wherein the machine learning model is a fully convolutional neural network (FCNN).

17. The system of claim 13, the pre-processing comprising:
cropping the original image according to the circular object;
resizing the cropped image to a standard size;
converting the original image to grayscale; and
blurring the edge image.

18. The system of claim 13, the method further comprising:
performing a dilate operation and an erode operation on the heatmap.

19. A computer program product comprising one or more computer readable storage media, and program instructions collectively stored on the one or more computer readable storage media, the program instructions comprising instructions configured to cause one or more processors to perform a method comprising:
pre-processing an original image into an edge image, wherein the original image depicts an oblique view of a circular object;
generating, by a machine learning model based on the edge image, a heatmap including an ellipse formed by the oblique view of the circular object;
partitioning the heatmap into a chunked heatmap by creating radial lines initiating from a center of the heatmap and radiating outward at predetermined angles;
generating a filtered chunked heatmap by removing chunks that exceed a distance threshold from a center of mass of the chunked heatmap;
computing ellipse parameters describing the ellipse of the filtered chunked heatmap; and
performing, using the ellipse parameters, an affine transformation on the original image to generate a rectified image, wherein the rectified image converts the ellipse to a circle.

20. The computer program product of claim 19, wherein the circular object is an analog gauge, wherein the ellipse is defined by a plurality of dial ticks on the analog gauge, and wherein the ellipse parameters comprise a center of the ellipse, axis half lengths of the ellipse, and an angle of a main axis of the ellipse.

* * * * *